(12) United States Patent
Meury et al.

(10) Patent No.: US 8,965,805 B2
(45) Date of Patent: Feb. 24, 2015

(54) METHOD AND SYSTEM FOR DELIVERING AND ACCESSING FILES

(75) Inventors: Herman G. Meury, Frankfort, IN (US); Eric J. Meury, Indianapolis, IN (US)

(73) Assignee: 1040 Bridge LLC, Speedway, IN (US)

( * ) Notice: Subject to any disclaimer, the term of this patent is extended or adjusted under 35 U.S.C. 154(b) by 267 days.

(21) Appl. No.: 12/289,287

(22) Filed: Oct. 24, 2008

(65) Prior Publication Data

US 2010/0106640 A1    Apr. 29, 2010

(51) Int. Cl.
| | | |
|---|---|---|
| *G06Q 40/00* | (2012.01) | |
| *G06Q 20/18* | (2012.01) | |
| *G06Q 20/12* | (2012.01) | |
| *G06Q 30/02* | (2012.01) | |
| *G06Q 20/10* | (2012.01) | |

(52) U.S. Cl.
CPC .............. *G06Q 20/123* (2013.01); *G06Q 20/18* (2013.01); *G06Q 20/1235* (2013.01); *G06Q 30/0283* (2013.01); *G06Q 20/102* (2013.01)
USPC ......................................................... 705/40

(58) Field of Classification Search
USPC ......................................................... 705/40
See application file for complete search history.

(56) References Cited

U.S. PATENT DOCUMENTS

| | | | | |
|---|---|---|---|---|
| 7,565,312 B1 * | 7/2009 | Shaw et al. | ..................... | 705/31 |
| 7,606,741 B2 * | 10/2009 | King et al. | ................... | 705/27.2 |
| 7,788,137 B1 * | 8/2010 | Tifford | ......................... | 705/26.1 |
| 2002/0010670 A1 * | 1/2002 | Mosler et al. | .................. | 705/37 |
| 2004/0103065 A1 * | 5/2004 | Kishen et al. | .................. | 705/64 |
| 2004/0260566 A1 * | 12/2004 | King | ................................ | 705/1 |
| 2007/0174124 A1 * | 7/2007 | Zagofsky et al. | ............... | 705/14 |

OTHER PUBLICATIONS

Studio Sound; "Liquid Audio Liquifier Pro v3.0 Liquifier Pro v3.0 software"; Jul. 1, 1998.*

Jean-Henry Morin; Konstantas, Dimitri. "Commercializaiton of electronic information"; Journal of End User Computing; Apr.-Jun. 2000.*

* cited by examiner

*Primary Examiner* — Edward Chang
(74) *Attorney, Agent, or Firm* — Woodard, Emhardt, Moriarty, McNett & Henry LLP

(57) ABSTRACT

A method and system for delivering and accessing files. The method and system may include the generation of a file for a first party by a second party. The file may be encoded in a machine readable format and may be may have its availability made known to the first party. The first party may then provide a payment to the second party via the web portal that allows them access to the document.

13 Claims, 5 Drawing Sheets

METHOD AND SYSTEM FOR DELIVERING AND ACCESSING FILES

BACKGROUND

There are a variety of ways through which modern technology allows one party to communicate or transact business with another party. Communications systems, such as email, also allow people to send files to one or more other parties. Also, files can be stored on websites for download. The access to these files may be allowed to any party or may be restricted in any of a variety of ways, such as password protection. Additionally, the download of a file or files may be made contingent upon the meeting of some other condition, such as the entry of an anti-spam verification word.

Also, in many lines of work, individuals request a business or other individual to perform a job, service or task for them. Examples of this include the services provided by accountants to clients and the services provided by lawyers to clients. Often the service provider in these situations will prepare a document, file or other work product and present it to the client for their review. After the client expresses approval the service provider may then release a final document or may choose to invoice the client at this time. However, as is often the case, the client at this point may delay or refuse payment to the service provide as the client has already received their desired work. Therefore service providers often have a difficult time in obtaining payment for a service or services that they have already delivered.

SUMMARY OF THE INVENTION

An embodiment includes a method of delivering and accessing a file. The method may include steps for preparing a document by a first party for client and encoding the document as a computer-readable file. The method may also include a step for uploading the file to a database by the first party as well as a step for assigning a monetary value to the file by the first party. Further steps of the method may include a step for alerting the client that the file is available in the database and a step for submitting payment to the web portal for the file by the client. Additionally, the method may have a step for accessing the file by the client.

Another exemplary embodiment includes a system for providing access to data. The system may have a first party that contracts with a second party to prepare one or more documents and a database that securely houses data. The system may further have one or more documents generated by the second party for the first party, the one or more documents encoded in a machine-readable format and uploaded to the database as well as a web portal that facilitates the one or more documents to be uploaded to the database. Also, the system can include a notification that is sent to a first party after the one or more documents are uploaded to the database and a display of information in the web portal regarding the one or more documents available to the first party. Further, the system may have a payment mechanism available to the first party that facilitates access to the document.

Yet another exemplary embodiment discloses a method of delivering a document. This method can have means for generating a document, means for encoding the document in a machine-readable format, means for uploading the document to a database, means for securing the document in the database, means for providing access to the document and means for transferring ownership of the document.

BRIEF DESCRIPTION OF THE FIGURES

Advantages of embodiments of the present invention will be apparent from the following detailed description of the exemplary embodiments thereof, which description should be considered in conjunction with the accompanying drawings in which.

DETAILED DESCRIPTION

Aspects of the invention are disclosed in the following description and related drawings directed to specific embodiments of the invention. Alternate embodiments may be devised without departing from the spirit or the scope of the invention. Additionally, well-known elements of exemplary embodiments of the invention will not be described in detail or will be omitted so as not to obscure the relevant details of the invention. Further, to facilitate an understanding of the description, discussion of several terms used herein follows.

The word "exemplary" is used herein to mean "serving as an example, instance, or illustration." Any embodiment described herein as "exemplary" is not necessarily to be construed as preferred or advantageous over other embodiments. Likewise, the terms "embodiments of the invention," "embodiment" and "invention" do not require that all embodiments of the invention include the discussed feature, advantage or mode of operation.

Further, many embodiments are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects of the invention may be embodied in a number of different forms, all of which have been contemplated to be within the scope of the claimed subject matter. In addition, for each of the embodiments described herein, the corresponding form of any such embodiments may be described herein as, for example, "logic configured to" perform the described action.

Figure 1:
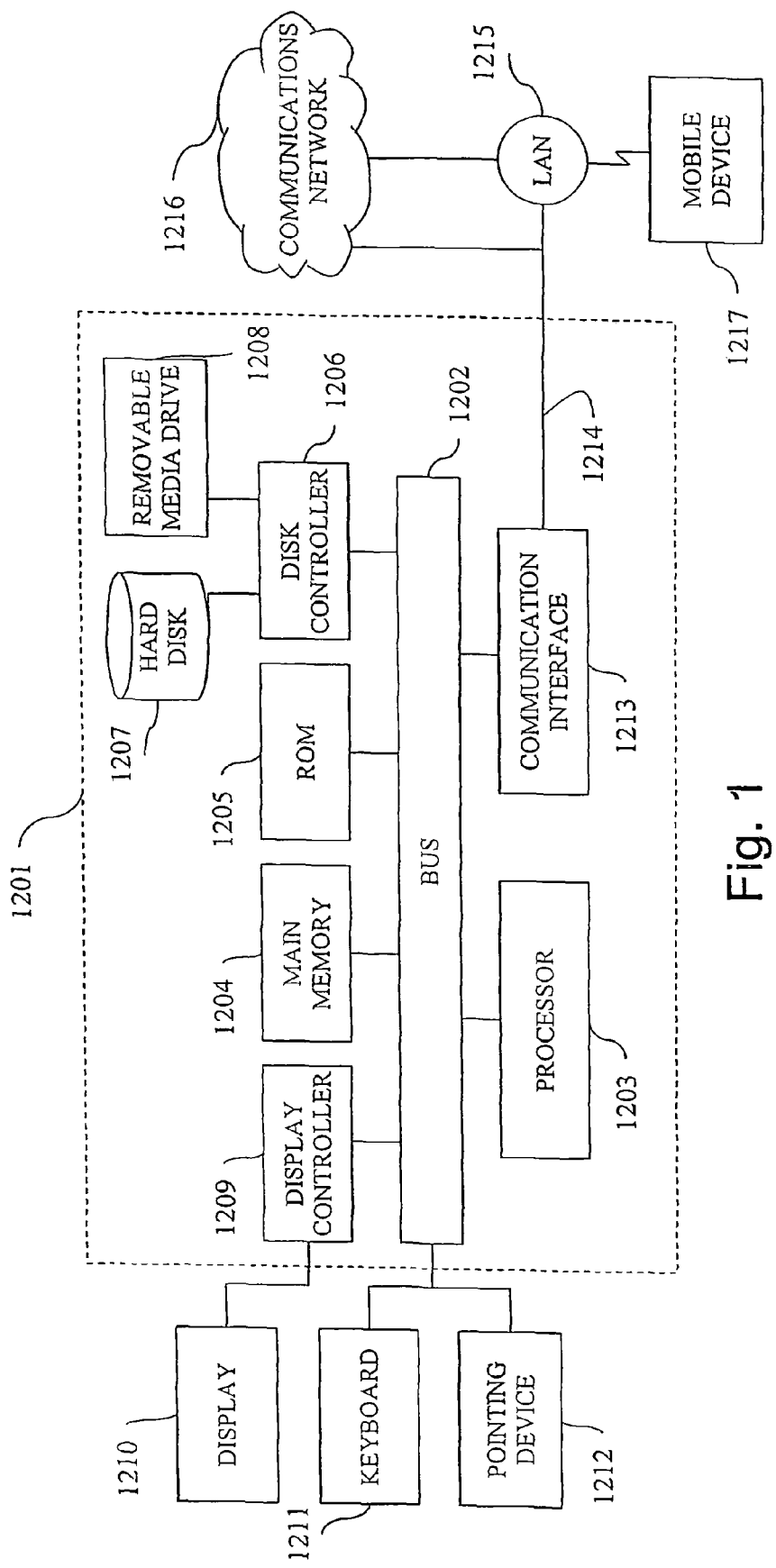
FIG. 1 is an exemplary diagram showing a computer system.

FIG. 1 illustrates a computer system 111 upon which an embodiment of the present invention may be implemented. The computer system 111 includes a bus 112 or other communication mechanism for communicating information, and a processor 113 coupled with the bus 112 for processing the information. The computer system 111 also includes a main memory 114, such as a random access memory (RAM) or other dynamic storage device (e.g., dynamic RAM (DRAM), static RAM (SRAM), and synchronous DRAM (SDRAM)), coupled to the bus 112 for storing information and instructions to be executed by processor 113. In addition, the main memory 114 may be used for storing temporary variables or other intermediate information during the execution of instructions by the processor 113. The computer system 111 further includes a read only memory (ROM) 115 or other static storage device (e.g., programmable ROM (PROM), erasable PROM (EPROM), and electrically erasable PROM (EEPROM)) coupled to the bus 112 for storing static information and instructions for the processor 113.

The computer system 111 also includes a disk controller 116 coupled to the bus 112 to control one or more storage devices for storing information and instructions, such as a magnetic hard disk 117, and a removable media drive 118 (e.g., floppy disk drive, read-only compact disc drive, read/write compact disc drive, compact disc jukebox, tape drive, and removable magneto-optical drive). The storage devices may be added to the computer system 111 using an appropriate device interface (e.g., small computer system interface (SCSI), integrated device electronics (IDE), enhanced-IDE (E-IDE), direct memory access (DMA), or ultra-DMA).

Further, exemplary embodiments include or incorporate at least one database which may store software, descriptive data, system data, digital images and any other data item required by the other components necessary to effectuate any embodiment of the present system known to one having ordinary skill in the art. The database may be provided, for example, as a database management system (DBMS), a relational database management system (e.g., DB2, ACCESS, etc.), an object-oriented database management system (ODBMS), a file system or another conventional database package as a few non-limiting examples. The database can be accessed via a Structure Query Language (SQL) or other tools known to one having skill in the art.

Still referring to FIG. 1, the computer system 111 may also include special purpose logic devices (e.g., application specific integrated circuits (ASICs)) or configurable logic devices (e.g., simple programmable logic devices (SPLDs), complex programmable logic devices (CPLDs), and field programmable gate arrays (FPGAs)).

The computer system 111 may also include a display controller 119 coupled to the bus 112 to control a display 120, such as a cathode ray tube (CRT), liquid crystal display (LCD) or any other type of display, for displaying information to a computer client 204. The computer system includes input devices, such as a keyboard 121 and a pointing device 122, for interacting with a computer client 204 and providing information to the processor 113. Additionally, a touch screen could be employed in conjunction with display 120. The pointing device 122, for example, may be a mouse, a trackball, or a pointing stick for communicating direction information and command selections to the processor 113 and for controlling cursor movement on the display 120. In addition, a printer may provide printed listings of data stored and/or generated by the computer system 111.

The computer system 111 performs a portion or all of the processing steps of the invention in response to the processor 113 executing one or more sequences of one or more instructions contained in a memory, such as the main memory 114. Such instructions may be read into the main memory 114 from another computer readable medium, such as a hard disk 117 or a removable media drive 118. One or more processors in a multi-processing arrangement may also be employed to execute the sequences of instructions contained in main memory 114. In alternative embodiments, hard-wired circuitry may be used in place of or in combination with software instructions. Thus, embodiments are not limited to any specific combination of hardware circuitry and software.

As stated above, the computer system 111 includes at least one computer readable medium or memory for holding instructions programmed according to the teachings of the invention and for containing data structures, tables, records, or other data described herein. Examples of computer readable media are compact discs, hard disks, floppy disks, tape, magneto-optical disks, PROMs (EPROM, EEPROM, flash EPROM), DRAM, SRAM, SDRAM, or any other magnetic medium, compact discs (e.g., CD-ROM), or any other optical medium, punch cards, paper tape, or other physical medium with patterns of holes, a carrier wave (described below), or any other medium from which a computer can read.

Stored on any one or on a combination of computer readable media, the present invention includes software for controlling the computer system 111, for driving a device or devices for implementing the invention, and for enabling the computer system 111 to interact with a human client 204. Such software may include, but is not limited to, device drivers, operating systems, development tools, and applications software. Such computer readable media further includes the computer program product of the present invention for performing all or a portion (if processing is distributed) of the processing performed in implementing the invention.

The computer code devices of the present invention may be any interpretable or executable code mechanism, including but not limited to scripts, interpretable programs, dynamic link libraries (DLLs), Java classes, and complete executable programs. Moreover, parts of the processing of the present invention may be distributed for better performance, reliability, and/or cost.

The term "computer readable medium" as used herein refers to any medium that participates in providing instructions to the processor 113 for execution. A computer readable medium may take many forms, including but not limited to, non-volatile media, volatile media, and transmission media. Non-volatile media includes, for example, optical, magnetic disks, and magneto-optical disks, such as the hard disk 117 or the removable media drive 118. Volatile media includes dynamic memory, such as the main memory 114. Transmission media includes coaxial cables, copper wire and fiber optics, including the wires that make up the bus 112. Transmission media also may also take the form of acoustic or light waves, such as those generated during radio wave and infrared data communications.

Various forms of computer readable media may be involved in carrying out one or more sequences of one or more instructions to processor 113 for execution. For example, the instructions may initially be carried on a magnetic disk of a remote computer. The remote computer can load the instructions for implementing all or a portion of the present invention remotely into a dynamic memory and send the instructions over a telephone line using a modem. A modem local to the computer system 111 may receive the data on the telephone line and use an infrared transmitter to convert the data to an infrared signal. An infrared detector coupled to the bus 112 can receive the data carried in the infrared signal and place the data on the bus 112. The bus 112 carries the data to the main memory 114, from which the processor 113 retrieves and executes the instructions. The instructions received by the main memory 114 may optionally be stored on storage device 117 or 118 either before or after execution by processor 113.

The computer system 111 also includes a communication interface 123 coupled to the bus 112. The communication interface 123 provides a two-way data communication coupling to a network link 124 that is connected to, for example, a local area network (LAN) 125, or to another communications network 126 such as the Internet. For example, the communication interface 123 may be a network interface card to attach to any packet switched LAN. As another example, the communication interface 123 may be an asymmetrical digital subscriber line (ADSL) card, an integrated services digital network (ISDN) card or a modem to provide a data communication connection to a corresponding type of communications line. Wireless links may also be implemented. In any such implementation, the communication interface 123 sends and receives electrical, electromagnetic or optical signals that carry digital data streams representing various types of information.

The network link 124 typically provides data communication through one or more networks to other data devices. For example, the network link 124 may provide a connection to another computer or remotely located presentation device through a local network 125 (e.g., a LAN) or through equipment operated by a service provider, which provides communication services through a communications network 126. In preferred embodiments, the local network 124 and the communications network 126 preferably use electrical, electromagnetic, or optical signals that carry digital data streams. The signals through the various networks and the signals on the network link 124 and through the communication interface 123, which carry the digital data to and from the computer system 111, are exemplary forms of carrier waves transporting the information. The computer system 111 can transmit and receive data, including program code, through the network(s) 125 and 126, the network link 124 and the communication interface 123. Moreover, the network link 124 may provide a connection through a LAN 125 to a mobile device 127 such as a personal digital assistant (PDA) laptop computer, or cellular telephone. The LAN communications network 125 and the communications network 126 both use electrical, electromagnetic or optical signals that carry digital data streams. The signals through the various networks and the signals on the network link 124 and through the communication interface 123, which carry the digital data to and from the system 111, are exemplary forms of carrier waves transporting the information. The processor system 111 can transmit notifications and receive data, including program code, through the network(s), the network link 124 and the communication interface 123.

Other aspects of the invention may include data transmission and Internet-related activities. See Preston Gralla, How the Internet Works, Ziff-Davis Press (1996), which is hereby incorporated by reference into this patent application. Still other aspects of the invention may utilize wireless data transmission, such as those described in U.S. Pat. Nos. 6,456,645, 5,818,328 and/or 6,208,445, all of which are hereby incorporated by reference into this patent application.

In one exemplary embodiment, a method and system for delivering and accessing files is disclosed. The method and system may include the generation of one of more files by a first party, the uploading of one of more files by the first party and access to one or more files by a second party if any of a variety of conditions is met.

Figure 2:
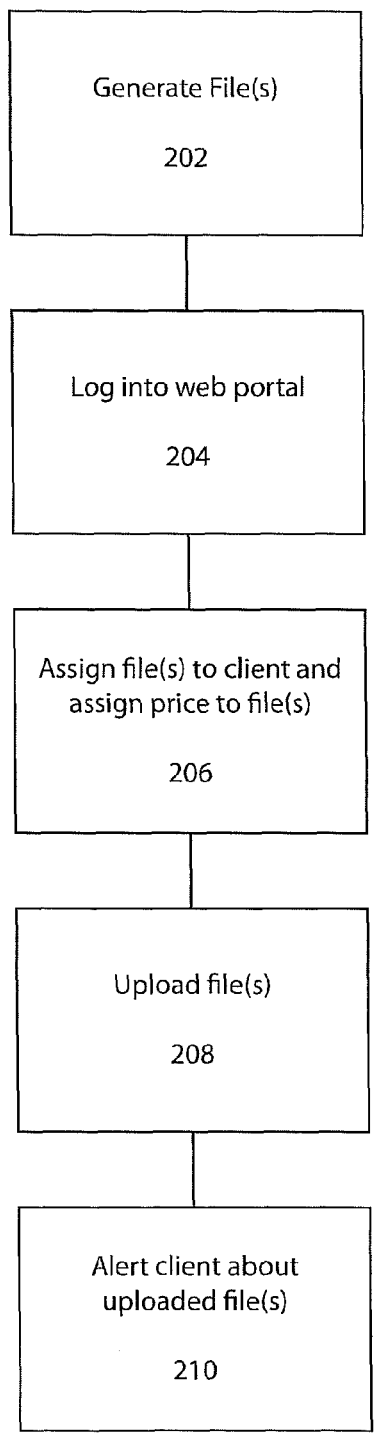
FIG. 2 is an exemplary flow chart of a method and system for delivering and accessing files.

For example, as shown in exemplary FIG. 2, a method and system for making a file or files available for an individual to download may be shown. In one exemplary embodiment, in step 202, a first party may generate a file, or, some exemplary embodiments, multiple files. The file may be any type of file, for example a legal document or an individual's income taxes or any other type of document that may be prepared for a client of any type. The file may be prepared and saved in any known machine-readable format, for example .DOC, .WPD, .PDF and the like. Additionally, the file may be any type that can be generated and saved on a computer. Further, in some exemplary embodiments, the file may be saved in multiple formats substantially simultaneously, for example .DOC, .WPD and .PDF.

The first party, in step 204, may then log into a web portal. The web portal may be a secure web portal. Additionally, the web portal may be logged into in any known manner. Further, the web portal may include a user-registration system whereby parties who wish to upload files to the web portal have to register and parties who wish to download files from the web portal may also have to register. Registration may include the input of any of a variety of personal or business information, contact information and bank or credit card information. Further, in some exemplary embodiments, a party who registers with the web portal may have to register as a party who may be uploading files and/or receiving payment for the files or a party who may be downloading files and/or paying for the files. In some other exemplary embodiments, and as discussed further with respect to FIG. 3, a party may be prompted to register for the web portal, for example via email or any other known form of communication. After the first party is registered he or she may select the appropriate party, such as a client, for which a file to be uploaded has been prepared, in step 206. The first party may have a list of clients to whom they have prepared, are preparing or will prepare files for available for the first party to choose from. Further, if a client has not been entered into the system previously, the first party may enter in any desired client information. Client information may include, but is not limited to, contact information, account information and work product information. Additionally, in step 206, the first party may assign a monetary value to the file. This value may be the fee that the client has to pay in order to gain access to the file and may be any fee determined by the first party, as described in more detail below.

Following the selection of the appropriate client information, the first party may, in step 208, upload the file to the web portal. As discussed previously, the file may be in any desired format. Additionally, the file may be uploaded in any desired format or in any combination or plurality of formats. The file may then be saved and/or housed in a database associated with the web portal. Additionally, after the file is uploaded, the file may be encrypted or secured in any known manner and access to the file may be limited to only desired or appropriate parties. The first party may have further access to the file, for example, to allow for the review of the file. Additionally, in some other exemplary embodiments, after the file is uploaded, the web portal may perform any of a variety of tasks or operations, such as scanning the file to check for potential computer viruses or checking to see if the file is complete or non-corrupted.

After the file is uploaded and any additional scanning or other desired tasks are performed, a communication may be dispatched to the client in step 210. The communication may be any type of communication, for example an email, instant message, text message, telephone call, facsimile, or the like. Additionally, the communication may be performed automatically or manually. In some exemplary embodiments, after the file is uploaded and saved, the web portal may send an automatic communication to the appropriate client. In other exemplary embodiments, the web portal may prompt the first party to determine whether or not the first party desires for the web portal to send a communication to the client. If the first party desires to send a communication to the client, the web portal may then do so in any of the manners described above. Alternatively, the first party may desire to contact the client outside of the web portal and may do so in any manner he or she chooses.

In some further exemplary embodiments, the communication in step 210 may include any of a variety of information. In some embodiments, the communication may simply inform the client that a file has been prepared for them. In other exemplary embodiments, the communication may include a link to the web portal that may allow the client to access their file. Additionally, some communications may include instructions regarding how to access the web portal, how to register for the web portal, how to navigate the web portal or any other web portal information. In still other exemplary embodiments, the communication may include information relating to the file that has been prepared or uploaded for the client. This information may include, but is not limited to, the nature or name of the file, the type of file, the content of the file, the size of the file, the time spent preparing the file and/or the price of the file. The price of the file may be equivalent to an invoice for the time, effort and cost expended by the first party in preparing the file or may be any other fee associated with accessing, viewing or downloading the file. In some other exemplary embodiments, the price of the file may be any fee desired to be charged by an administrator of the web portal or the first party who may have generated the file.

Figure 3:
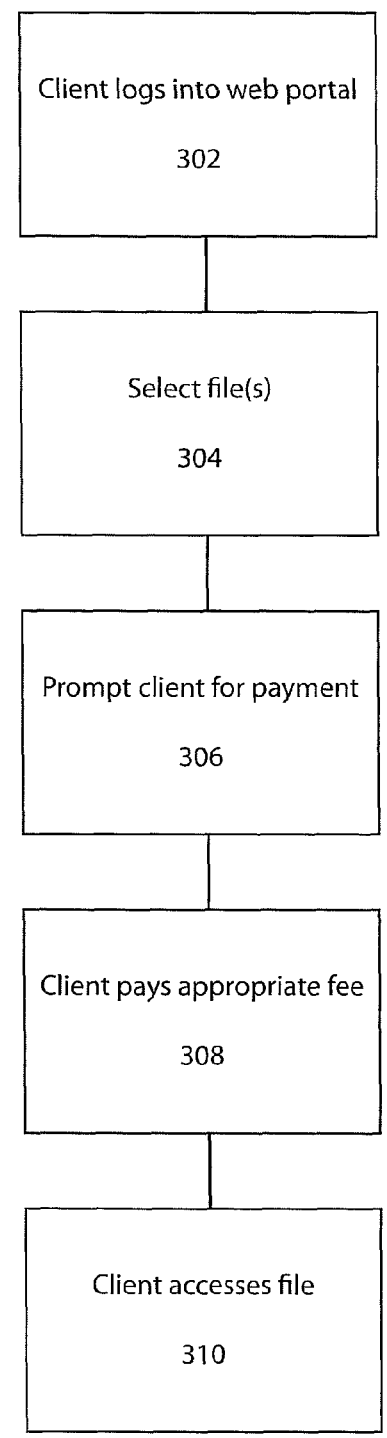
FIG. 3 is another exemplary flow chart of a method and system for delivering and accessing files.

As shown in exemplary FIG. 3, a client, such as that referenced with respect to the above discussion, may access a file on a web portal. The file to be accessed by the client may be a unique file that is generated specifically for that client and assigned to the client, as discussed previously. For example, the client may have requested that a first party, such as an accountant, prepare his or her income taxes. The file hosted on the web portal may be an electronic version of the client's income taxes. Alternatively, any known type of document or file that a client could request may be found on the web portal. In step 302, the client may gain access to the web portal by logging in. The client may have previously registered or set up an account with the web portal. Alternatively, the client may need to register in step 302. In some exemplary embodiments, the client may be prompted to register at the request of the first party. Additionally, the client may be prompted to proceed to the web portal by a communication, such as any communication by the web portal or the first party, as described previously with respect to step 210. For example, if the first party prepares a document for the client or otherwise adds a client to a list of clients, the client may be sent registration information by the web portal. The registration information can contain any of a variety of information, such as a username and password for the web portal, and any other information desired to be communicated to the client prior to their use of the web portal.

In some exemplary embodiments, after the client logs in at 302, they may be directed to a webpage where a link to the appropriate file is found. In other exemplary embodiments, as part of the log in process or following a log in or registration, the client may be asked some additional questions or may otherwise provide proof of their identity or determine which file they should be allowed to access.

After the client logs in at step 302, they may select the appropriate file they wish to access in step 304. The file may be presented or stored in any of a variety of manners, as described previously. Additionally, the file may have any desired name, such as a name related to that of the client or a name that was previously agreed upon by the first party and/or the client. The file may also be available for download or viewing in any known format, such as those described previously, or in a variety of different formats, which may allow for the file to be downloaded and/or opened using any of a variety of software tools.

After the client has selected the desired file in step 304 he or she may, in step 306, be prompted for payment. The prompting for payment in step 306 may be performed in any desired manner. In some exemplary embodiments, the client may be presented with a credit card form and/or credit card agreement. In other exemplary embodiments, the client may be presented with a variety of options, such as options to pay for the file via credit card, via e-check or via an Internet payment service, such as Paypal®. In still other exemplary embodiments, the client may be given additional options, such as payment by check or wire transfer as well as the instructions for making such a payment.

In step 308, the client may make the appropriate payment. Then, in some exemplary embodiments where the client is able to pay instantaneously or substantially instantaneously, such as via credit card, e-check or an Internet payment service, the file may be immediately available for the client to download or view, as described in step 310. However, in other exemplary embodiments where a payment may take longer to be processed or may take longer to receive, the file may not be available for viewing or download until the payment is received by the first party or any other authorized party.

In step 310, following a received payment and any desired authorization from the first party or any other authorized party, the client may download or otherwise view the file. As discussed previously, the file may be in any of a variety of formats and may contain a document, forms, data or any other information that the client may have previously contracted or agreed to have the first party perform. The client may then be free to review the file using any appropriate or desired software and may choose to take or perform any additional desired actions with the file that the client chooses.

Additionally, in some further exemplary embodiments, the client may make their payment to the web portal. In these embodiments, the web portal may act as a service that receives payment and then transfers the necessary fees to the first party who generated the file or files. The web portal then may retain a percentage of the fee, such as a service fee or other fee for using the services provided by the web portal. This fee may be any fee or percentage and may be dictated by the web site or may be a fee that the web portal and the first party have previously negotiated based upon each file, each client or any other desired criteria.

In other examples, the web portal may be software that the first party is using directly. For example, the web portal may be integrated into a website that is maintained by the first party. In these examples, any payments received by the web portal may be directly deposited or credit to the first party. Further, the first party may pay a licensing agreement or other fee for use of the systems and tools associated with the web portal.

Figure 4:
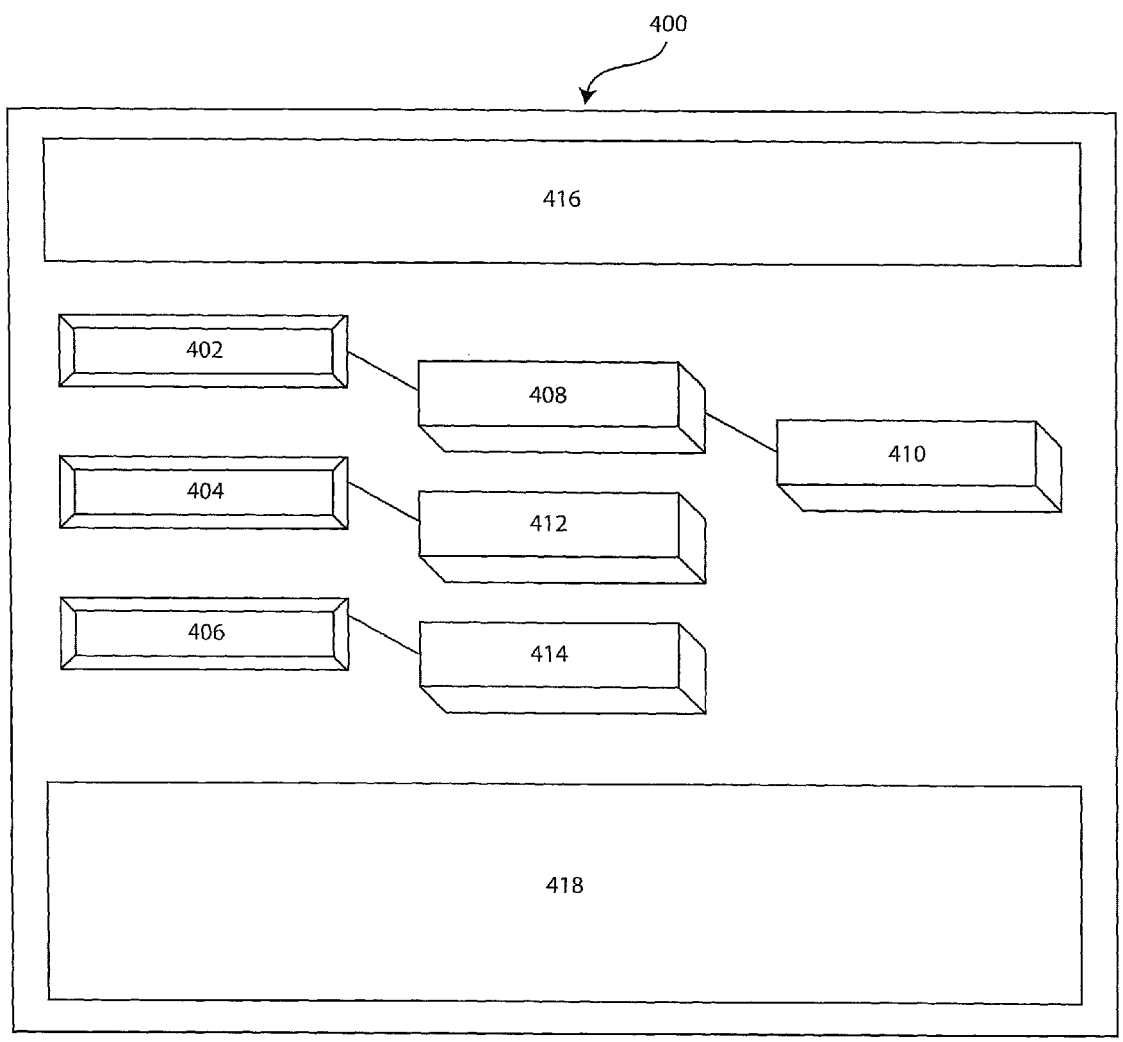
FIG. 4 and FIG. 4B are exemplary screen shots of a web portal used for file access and uploading.

In still other exemplary embodiments and referring, generally, to FIG. 4, the first party, after logging in to the web portal, may be presented with a variety of options. For example, the first party may be presented with a landing page 400 that includes a client menu button 402, which may be linked to list of the first party's clients, for example in client menu 408, and a tools button 404, which may be linked to a tools menu 412 available to him or her. The first party may also be presented with a variety of options in client menu 408, such as options to update the profile of one or more clients, add or remove one or more clients and upload a file. As discussed previously, information in a client's file that may be updated includes the name, address, telephone number, social security number, employer information, docket name or name or any other desired information.

Still other options that may be presented to the first party in client menu 408 include options to view a list of clients. The list of clients may be a list that shows clients that the first party has prepared work for or clients that the first party is scheduled to prepare work for, for example. Additionally, the first party may be presented with any of a variety of additional file options in client menu 408, such as an option to upload a file. If the option to upload a file is selected, file upload menu 410 may be displayed and may include, along with an option to upload the file, options to input a description, alternative filename and price for the file.

Figure 4B:
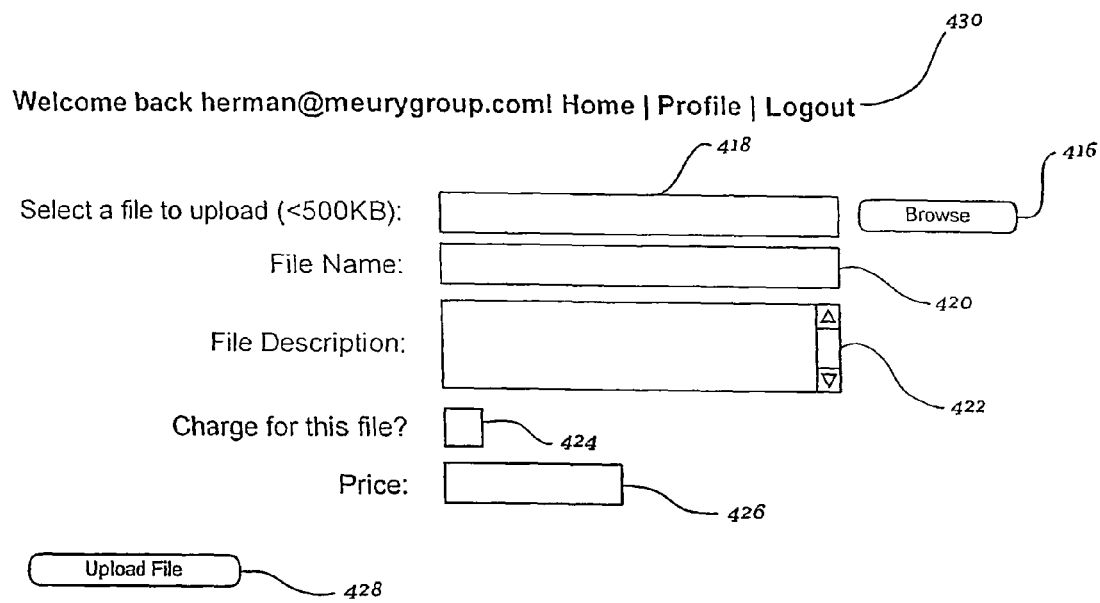

One example of a file menu is shown in FIG. 4B. Here, the first party may be presented with an button 416 that allows him or her to browse for a file he or she may wish to upload. In some exemplary embodiments, the file may be limited to less than 500 KB, however in other exemplary embodiments, the file may be any size and may be of any type. After selecting a desired file to upload, the name and/or location of the file may appear in field 418. The first party may then put name the file with any name in field 420, for example a name that the first party and a client previously agreed upon or discussed. Additionally, in field 422, the first party may enter a description of the file. The description may be any description, such as an overview of the type of document or a summary of the uploaded file. Additionally, the first party may check if they wish to charge a price for this file using box 424 and enter their desired or predetermined price in field 426. In some exemplary embodiments, however, if the first party does not check box 424, the uploaded file may be available for anyone to download without paying. The first party may provide, for example, samples of documents that others may download without incurring a fee. After all of the desired information is complete, the client may choose to upload the file by selecting upload button 428. The file may then be uploaded and available for download by a client. Additionally, in FIG. 4b as well as any other exemplary embodiment, header 430 may be displayed. Header 430 may contain links to any other menus described herein. Additionally, header 430 may contain identification information and a link that may allow a user or client to log out of the system.

In some further exemplary embodiments, and referring back to FIGS. 2-3, after a file is successfully uploaded by the first party, a message, such as an email, may be sent to the first party and any desired client that informs each of them that a file has been successfully uploaded, as well as any desired filename, description and/or price information.

Additionally, the option to upload a file may be selected and may present the first party with an upload menu 410. In a further example, the tools available to a first party in tools menu 412 may include, but are not limited to, a profile editing tool, a report generator and a tool for adding a new client. The first party may be able to run a report on any of a variety of topics, for example, a report on files they have made available, a report on files that have been accessed, a report on files that have been paid for, a report on files that have not been paid for and any other type of desired report.

In some further exemplary embodiments, and still referring to FIG. 4, the first party may also be presented with a file list button 406 after they have logged into the web portal. The file list may be connected to file menu 414 and may include any of a variety of details or information, such as the filenames and extensions of files they have prepared, descriptions of the files, the amount of money invoiced for the files and/or amount of money that remains to be paid for the files. Additionally, where a client has not yet paid for a file, the first party may be presented with an option for deleting the file or sending a reminder communication to the client.

In still further exemplary embodiments, fields 416 and 418 may be included on landing page 400. Fields 416 and 418 may include any type of information, such as information or links regarding the first party, information or links regarding the web portal, information or links regarding content found elsewhere on the web portal and/or information or links to any desired client, file or other tool, text, image or images that may be desired.

Figure 5:
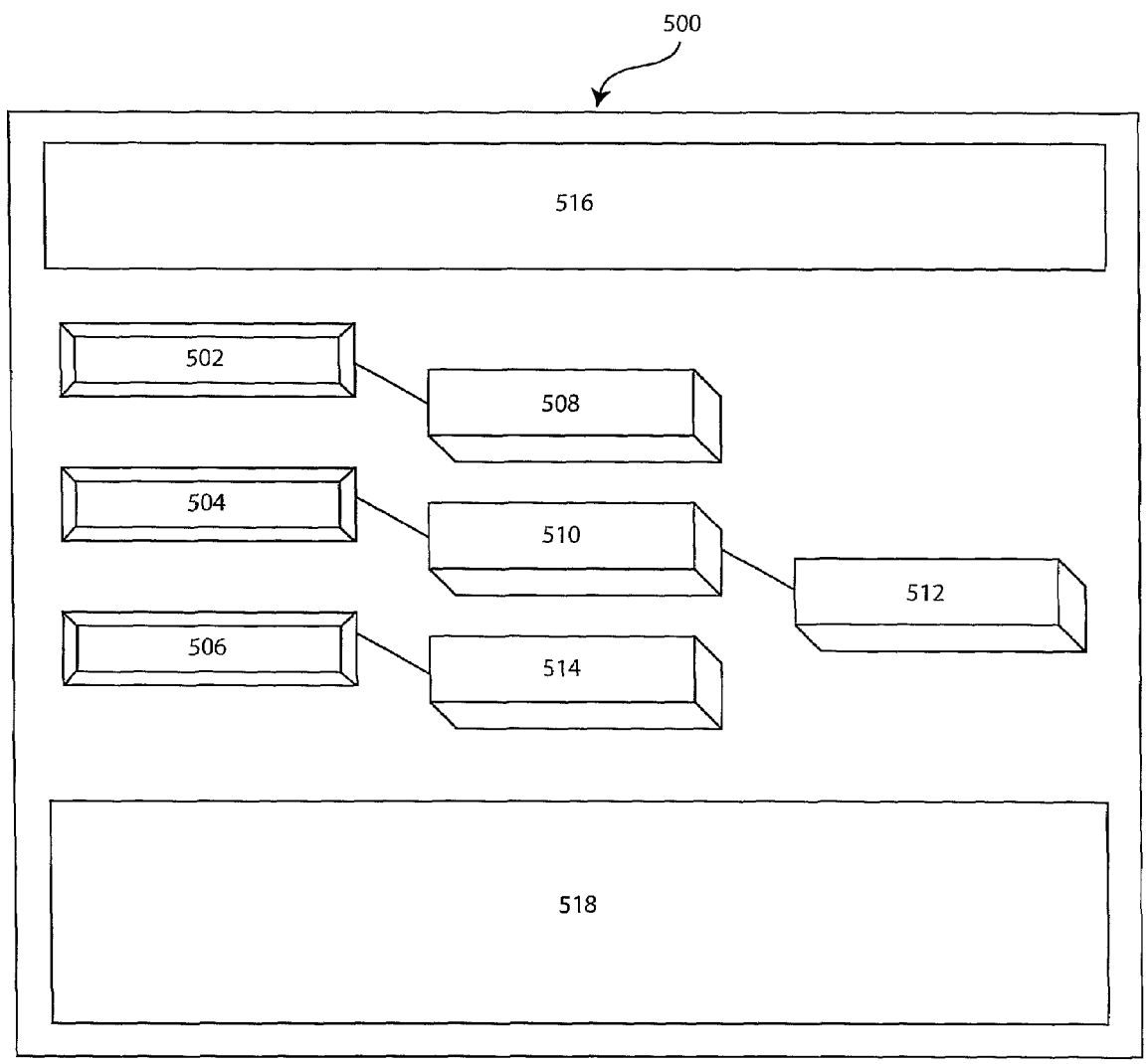
FIG. 5 is an exemplary screen shot of a web port used for file access and downloading.

In another exemplary embodiment, and referring to FIG. 5, a client may be presented with any of a variety of options on landing page 500 when they log into a web portal. In some exemplary embodiments, the client page may substantially mirror that of the first party, as described with respect to FIG. 4. However, there may be some differences in options between what the client may do versus what the first party may do.

For example, the client may be presented with a profile button 502 that leads to profile menu 508, which may have options to edit their personal information or, in some embodiments, an option to notify the first party to change any information related to the client. In still other examples, if the client changes any of their information, a message may be sent to the first party regarding any such changes. Additionally, other menus, such as a file menu 510, may be available. The file menu 510 may be selected through file button 504 and may have a listing of files that the client may be able to see that were prepared or are otherwise available for that client. The list may include filenames, descriptions of the file and the price of the file (i.e. the price the client would need to pay in order to view or access the file). Additionally, the file menu 510 may be supplemented with any of a variety of payment options in payment menu 512, such as those described previously. The payment options menu 512 may also be embedded into a link associated with a filename, so that if the client clicks on a filename, they may be taken to a page having the aforementioned payment options menu 512 and that may then allow them to download or otherwise access a file. Additionally, other exemplary embodiments may allow for the client to search, in any known manner, for files that may have been prepared for him or her.

Still referring to FIG. 5, the client may also have client tools button 506, which may be associated to client tools menu 514. Client tools menu 514 may include any of a variety of tools useful to the client, such as a tool to run reports regarding what files they have downloaded, how much they have paid for previously downloaded files or any other desired tools. Further, and similar to elements 416 and 418 of FIG. 4, fields 516 and 518 of FIG. 5 may be configured to show any data that is desired.

In still other exemplary embodiments, the web portal may have one or more administrators. The one or more administrators may be responsible for administrating the web portal and any content found thereon, as is known in the art. Additionally, the one or more administrators may have the ability to perform any web portal maintenance or to regulate the content or use of the web portal in any known manner.

The foregoing description and accompanying drawings illustrate the principles, preferred embodiments and modes of operation of the invention. However, the invention should not be construed as being limited to the particular embodiments discussed above. Additional variations of the embodiments discussed above will be appreciated by those skilled in the art.

Therefore, the above-described embodiments should be regarded as illustrative rather than restrictive. Accordingly, it should be appreciated that variations to those embodiments can be made by those skilled in the art without departing from the scope of the invention as defined by the following claims.

What is claimed is:

1. A method of delivering and accessing a tax return, comprising:
    preparing the tax return, via a computer, by a first party for a client;
    encoding, by a computer, the tax return as a computer-readable file;
    assigning, by a computer, the file to the client;
    assigning, by a computer, a monetary value to the file by the first party;
    uploading the file, by a computer, to a network-accessible database by the first party, wherein the database is accessible via a web portal;
    alerting the client, by an electronic message, that the file is available in the database;
    submitting payment, by a computer and network connection, via the web portal for the file by the client;
    transferring ownership, by a computer, of the file to the client after the client has submitted payment for the file;
    preventing, by a computer, the first party from altering the file after the client has submitted payment for the file, while the file is stored in the database of the web portal;
    accessing the file, via a computer and network connection, by the client;
    distributing, electronically, at least a portion of the payment submitted by the client to the first party;
    retaining, by the web portal, a percentage of the payment submitted by the client as a service fee for use of the web portal;
    wherein the tax return is a unique file prepared with information originally supplied by the client, and generated specifically for the client by the first party;
    wherein the database and the web portal are hosted by a party that is separate from the first party and the client; and
    authenticating the identity of the client with the computer before said accessing the file.

2. The method of claim 1, further comprising:
    preventing by a computer, the accessing of the file by a second party until the second party has submitted payment for the file.

3. The method of claim 1, further comprising:
    logging into a web portal, via a computer, by the first party, to upload the file to the database.

4. The method of claim 1, further comprising:
    logging into a web portal, via a computer, by the client, to access the file.

5. The method of claim 1, wherein the first party registers with a web portal prior to uploading the file.

6. The method of claim 1, wherein the client registers with a web portal prior to submitting payment for the file.

7. The method of claim 1, wherein the service fee is a predetermined amount negotiated between the first party and the web portal.

8. A method, comprising:
    receiving an association input from a service provider with a computer system that associates an electronic tax return file with a client, wherein the tax return file contains information that is unique to the client, wherein the tax return file is prepared by the service provider;
    associating the tax return file to the client in the computer system in response to said receiving the association input from the service provider;
    receiving a pricing input from the service provider with the computer system, wherein the pricing input sets the price for the tax return file;
    assigning a price to the tax return file with the computer system in response to said receiving the pricing input from the service provider;
    alerting the client to the availability of the tax return file on the computer system by sending an electronic communication from the computer system to the client, wherein said alerting occurs after said associating the tax return file to the client;
    preventing access by the client to the tax return file with the computer system;
    receiving payment for at least the price of the tax return file after said preventing access;
    transferring ownership, by a computer, of the file to the client after the client has submitted payment for the file;
    preventing, by the computer system, the service provider from altering the file after said receiving the payment, while the file is stored on the computer system;
    allowing access by the client to the tax return file on the computer system in response to said receiving the payment;
    retaining, by the computer system, a portion of the payment submitted by the client as a service fee for use of the computer system;
    authenticating the identity of the client with the computer system before said allowing access by the client to the tax return file; and
    transferring the payment amount less the service fee to the service provider after said receiving the payment.

9. The method of claim 8, further comprising:
    setting the fee with the computer system based upon a pre-negotiated amount for each file.

10. The method of claim 8, wherein the fee for said retaining is based upon a pre-negotiated amount for the client.

11. The method of claim 8, further comprising:
    receiving with the computer system the tax return file uploaded by the service provider; and
    saving the tax return file in the computer system.

12. The method of claim 11, further comprising:
    preparing the tax return file by the service provider based on the information that is unique to the client before said receiving.

13. The method of claim 8, wherein the service provider is an accountant.

* * * * *